(12) United States Patent
Kung

(10) Patent No.: US 8,047,549 B2
(45) Date of Patent: Nov. 1, 2011

(54) MAGNETIC FLUID SHAFT-SEALING DEVICE

(76) Inventor: Chang Cheng Kung, Kaohsiung (TW)

( * ) Notice: Subject to any disclaimer, the term of this patent is extended or adjusted under 35 U.S.C. 154(b) by 395 days.

(21) Appl. No.: 12/406,158

(22) Filed: Mar. 18, 2009

(65) Prior Publication Data

US 2010/0171271 A1 Jul. 8, 2010

(51) Int. Cl.
 *F16J 15/43* (2006.01)
 *F16J 15/34* (2006.01)
(52) U.S. Cl. .................. 277/410; 277/370; 277/371
(58) Field of Classification Search .................. 277/410, 277/390–397, 352, 346, 369–371
See application file for complete search history.

(56) References Cited

U.S. PATENT DOCUMENTS

| | | | | |
|---|---|---|---|---|
| 3,620,584 A | * | 11/1971 | Rosensweig | 384/446 |
| 4,054,293 A | * | 10/1977 | Hoeg et al. | 277/410 |
| 4,995,622 A | * | 2/1991 | Fuse | 277/410 |
| 5,951,020 A | * | 9/1999 | Orlowski | 277/419 |
| 6,322,079 B1 | * | 11/2001 | Mullaney, III | 277/371 |
| 6,494,458 B2 | * | 12/2002 | Uth | 277/358 |
| 6,722,657 B2 | * | 4/2004 | Hood et al. | 277/345 |

* cited by examiner

*Primary Examiner* — Thomas Beach
*Assistant Examiner* — Nicholas Foster
(74) *Attorney, Agent, or Firm* — Alan Kamrath; Kamrath & Associates PA

(57) ABSTRACT

A magnetic fluid shaft-sealing device includes a seal cover (3) attached to a pump housing (1) in which a rotary shaft (2) is mounted. The seal cover (3) includes: a shaft hole (33) extending along an axis, an annular recess (36) formed in an outer end face (32) around the shaft hole (33), and an inner ring portion (363) defined between the annular recess (36) and the shaft hole (33). A collar (4) is mounted around the rotary shaft (2) to rotate therewith and includes a first end (41) received in the annular recess (36) and around the inner ring portion (363). A magnet (6) and two pole pieces (5) are mounted between an outer periphery (364) of the inner ring portion (363) and the first end (41) of the collar (4). A gap (71) is formed between an inner periphery (440) of the first end (41) of the collar (4) and outer peripheries of the pole pieces (5), and a magnetic liquid (7) is filled in the gap (71) to provide a liquid seal therebetween.

10 Claims, 20 Drawing Sheets

MAGNETIC FLUID SHAFT-SEALING DEVICE

BACKGROUND OF THE INVENTION

The present invention relates to a magnetic fluid shaft-sealing device and, more particularly, to a magnetic fluid shaft-sealing device for a pump.

It is well known to mount a mechanical seal or a magnetic fluid seal in a pump for sealing between a pump housing of the pump and a rotary shaft in the pump housing. A typical magnetic fluid seal device generally includes a plurality of annular magnets mounted in an interior of the pump housing and around the rotary shaft or a shaft sleeve. Each magnet is sandwiched between two pole pieces also mounted around the rotary shaft. A magnetic liquid is filled in a sealing gap between an outer periphery of the rotary shaft and inner peripheries of the pole pieces. The rotary shaft and the poles pieces are made of magnetizable material. A closed magnetic circuit with magnetic force is created by flows of magnetic field lines from the magnets through the poles pieces, the rotary shaft, and the magnetic liquid and, thus, retains the magnetic liquid in the sealing gap to provide a sealing effect between the pump housing and the rotary shaft. The sealing effect of the magnetic fluid seal device mainly depends on the ability of keeping the magnetic liquid in the sealing gap. In such a magnetic fluid seal device, the magnetic liquid in the sealing gap tends to escape from openings in two sides of the sealing gap due to centrifugal force generated during rotation of the rotary shaft. To avoid this problem, it is generally necessary to increase the number of the magnets and/or decrease a width of the sealing gap in a radial direction. However, it is inconvenient to manufacture and assemble the magnetic fluid seal device in a narrow sealing gap. Further, more magnets lead to bulky structure and increased costs.

Thus, a need exists for a magnetic fluid seal device that can securely retain the magnetic liquid in the sealing gap while allowing easy assembly.

BRIEF SUMMARY OF THE INVENTION

The present invention solves this need and other problems in the field of magnetic fluid seal devices by providing, in a preferred form, a magnetic fluid shaft-sealing device including a seal cover having inner and outer end faces spaced along an axis. The inner end face of the seal cover is adapted to be attached to an end of a pump housing. The seal cover further includes a shaft hole extending from the inner end face through the outer end face along the axis. The seal cover further includes an annular recess formed in the outer end face and around the shaft hole. An inner ring portion is defined between the annular recess and the shaft hole and has an outer periphery defining an inner wall face of the annular recess. The magnetic fluid shaft-sealing device further includes a collar adapted to be mounted around a rotary shaft in the pump housing to rotate therewith. The collar includes a first end received in the annular recess and around the inner ring portion of the seal cover. The collar further includes a second end spaced from the first end of the collar along the axis. The collar further includes a longitudinal hole extending from the first end through the second end of the collar and coaxial with the axis. The rotary shaft extends through the longitudinal hole of the collar and the shaft hole of the seal cover. The first end of the collar includes an annular inner periphery having a spacing to the outer periphery of the inner ring portion of the seal cover in a radial direction perpendicular to the axis. A magnet is mounted between the outer periphery of the inner ring portion of the seal cover and the first end of the collar. Two pole pieces are mounted between the outer periphery of the inner ring portion of the seal cover and the first end of the collar. The magnet is sandwiched between the pole pieces. A gap is formed between the inner periphery of the first end of the collar and outer peripheries of the pole pieces. A magnetic liquid is filled in the gap to provide a liquid seal between the inner periphery of the first end of the collar and the outer peripheries of the pole pieces.

In the most preferred form, the inner periphery of the first end of the collar includes a plurality of annular grooves spaced from one another in a direction parallel to the axis.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where:

FIG. 11A shows an enlarged view of a circled portion of FIG. 11.

Figure 1:
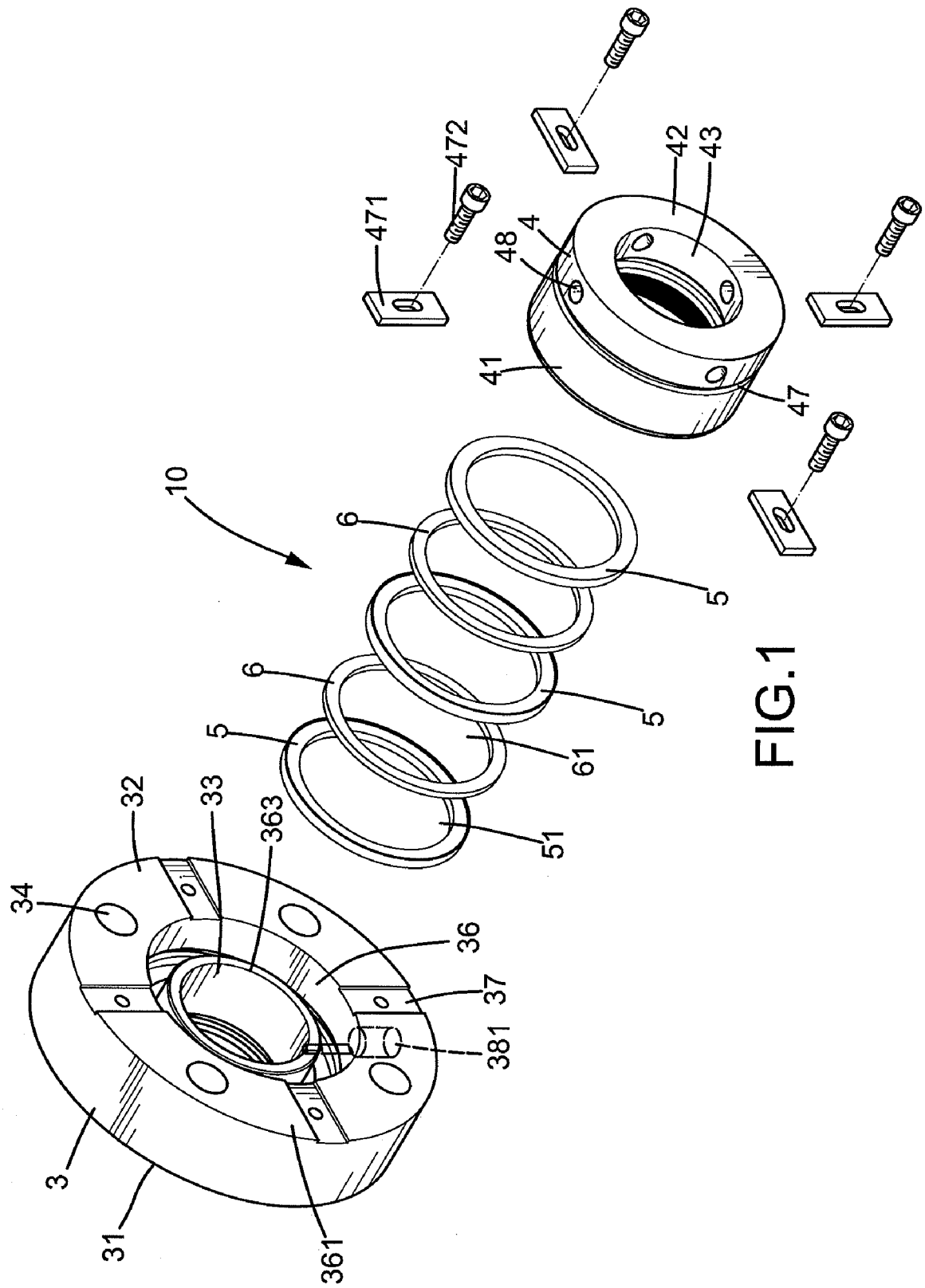
FIG. 1 shows an exploded, perspective view of a magnetic fluid shaft-sealing device of a first embodiment according to the preferred teachings of the present invention.
Figure 2:
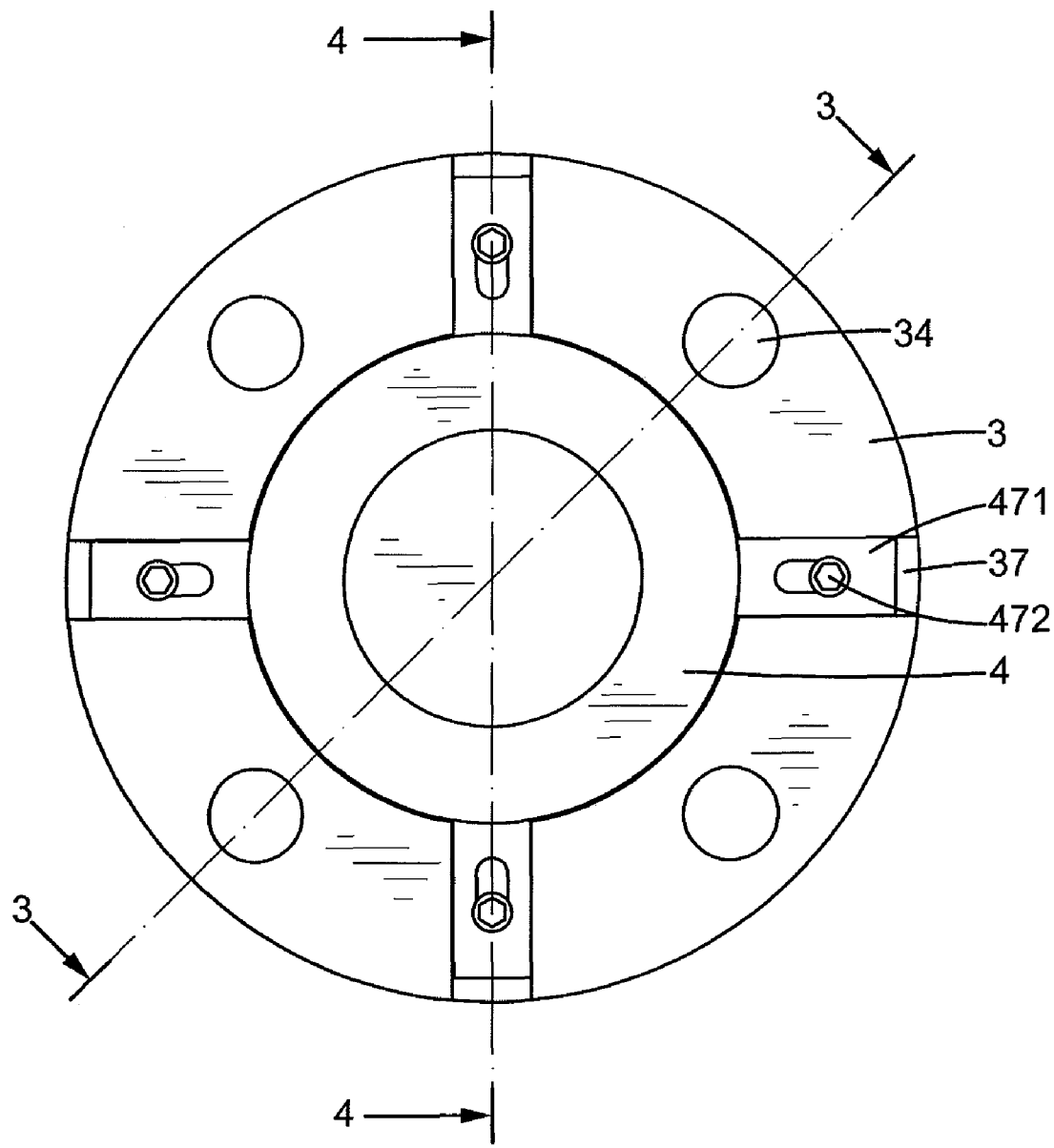
FIG. 2 shows a side view of the magnetic fluid shaft-sealing device of FIG. 1 after assembly.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "longitudinal", "inner", "outer", "side", "end", "portion", "section", "radial", "spacing", "centrifugal", "vertical", "annular", "width", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

Figure 3:
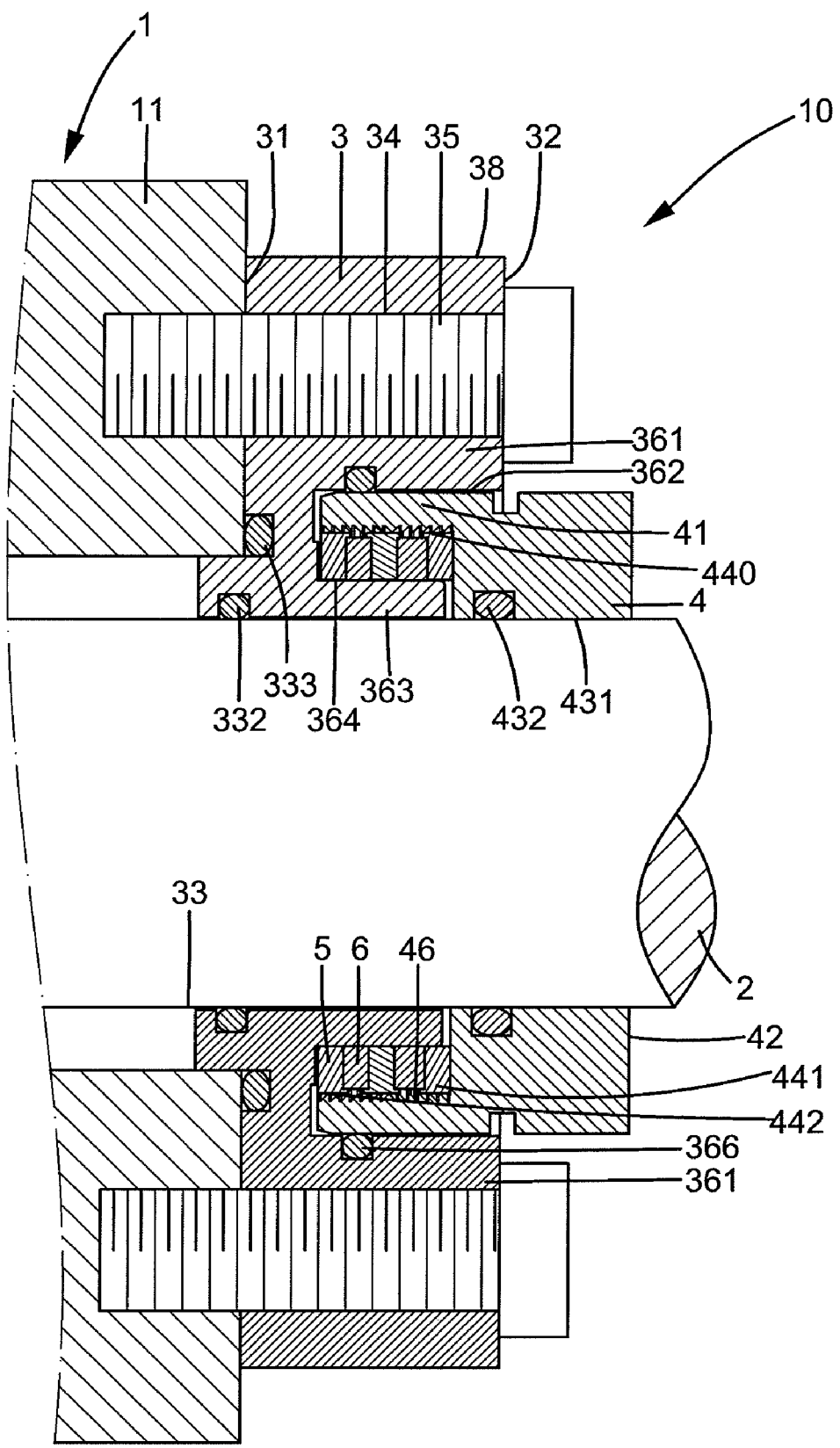
FIG. 3 shows a cross sectional view of the magnetic fluid shaft-sealing device of FIG. 1 taken along section line 3-3 of FIG. 2 with the magnetic fluid shaft-sealing device attached to an end of a pump housing and mounted around a rotary shaft in the pump housing.
Figure 4:
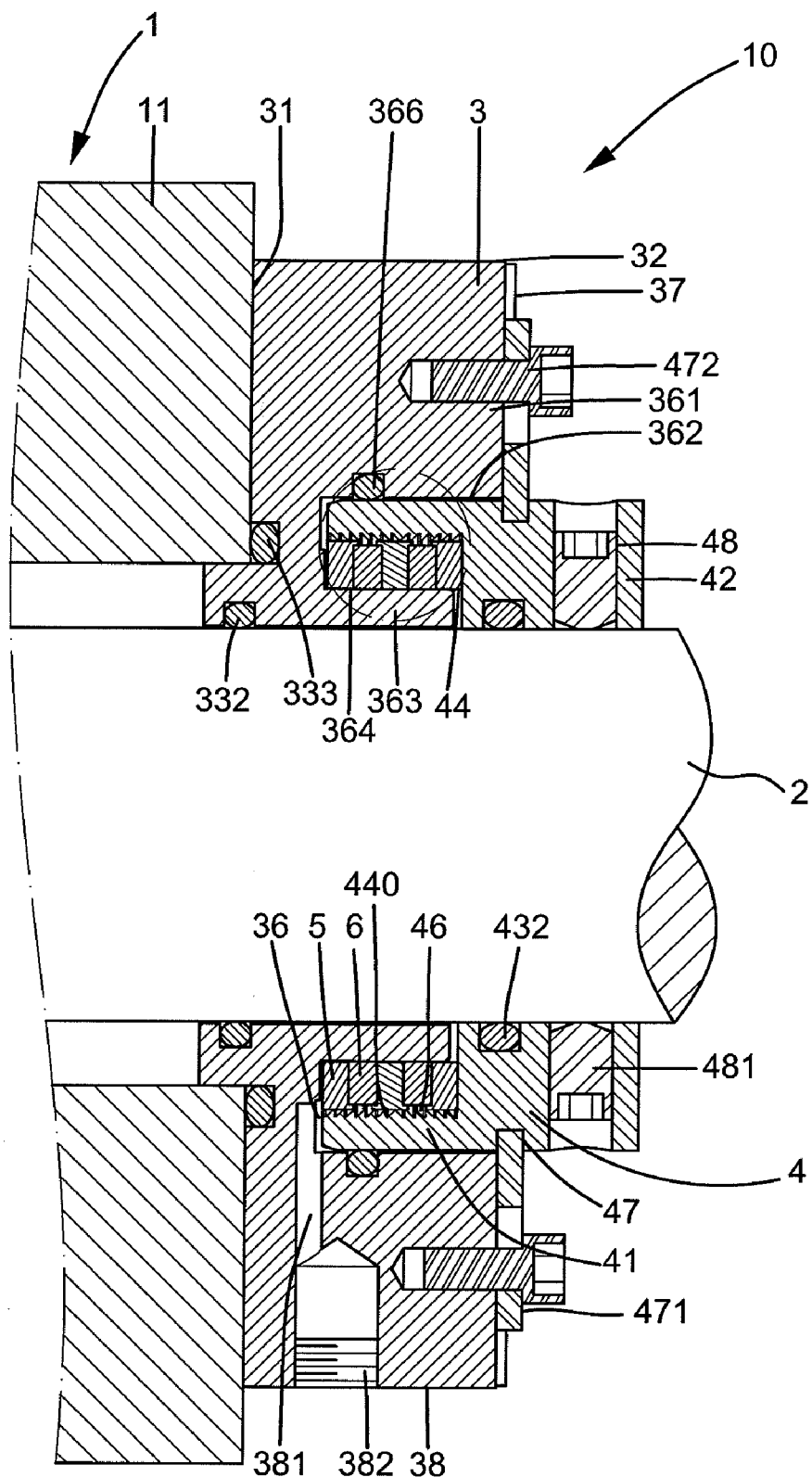
FIG. 4 shows a cross sectional view of the magnetic fluid shaft-sealing device of FIG. 1 taken along section line 4-4 of FIG. 2 with the magnetic fluid shaft-sealing device attached to the pump housing and mounted around the rotary shaft.

A magnetic fluid shaft-sealing device according to the preferred teachings of the present invention is shown in the drawings and generally designated 10. Magnetic fluid shaft-sealing device 10 is attached to a pump housing 1 and mounted around a rotary shaft 2 in pump housing 1 to provide a liquid seal between pump housing 1 and rotary shaft 2 (see FIG. 3).

In a first preferred form shown in FIGS. 1-5, magnetic fluid shaft-sealing device 10 includes a seal cover 3, a collar 4, two magnets 6, three pole pieces 5, and a magnetic liquid 7. Seal cover 3 includes inner and outer end faces 31 and 32 spaced along an axis. Inner end face 31 is attached to an end 11 of pump housing 1, and an O-ring 333 is mounted in inner end face 31 for sealing purposes. Seal cover 3 further includes a shaft hole 33 extending from inner end face 31 through outer end face 32 along the axis. Rotary shaft 2 extends through shaft hole 33, and an O-ring 332 is mounted around rotary shaft 2 for sealing purposes. An annular recess 36 is formed in outer end face 32 and around shaft hole 33. An inner ring portion 363 is defined between annular recess 36 and shaft hole 33 and has an outer periphery 364 defining an inner wall face of annular recess 36. An outer ring portion 361 is radially outside of annular recess 36 and includes a plurality of through-holes 34 extending from inner end face 31 through outer end face 32 along the axis. Screws 35 respectively extend through through-holes 34 into end 11 of pump housing 1 to attach seal cover 3 to pump housing 1. A plurality of engaging slots 37 is defined in outer end face 32 of outer ring portion 361 and each is located between two adjacent through-holes 34. An opening 381 is formed in an outer periphery 38 of seal cover 3 and in communication with annular recess 36. A plug 382 is received in and closes opening 381.

Collar 4 is mounted around rotary shaft 2 to rotate therewith. Collar 4 is made of magnetizable material and includes first and second ends 41 and 42 spaced along the axis. First end 41 of collar 4 is received in annular recess 36 and mounted around inner ring portion 363 of seal cover 3. A spacing is defined between an annular inner periphery 440 of first end 41 and outer periphery 364 of inner ring portion 363 in a radial direction perpendicular to the axis. An O-ring 366 is mounted in an inner periphery 362 of outer ring portion 361 to provide a sealing effect between first end 41 of collar 4 and outer ring portion 361 of seal cover 3. Collar 4 further includes a longitudinal hole 43 extending from first end 41 through second end 42 and coaxial with the axis. Rotary shaft 2 extends through longitudinal hole 43 of collar 4, and an O-ring 432 is mounted around rotary shaft 2 for sealing purposes. Longitudinal hole 43 in first end 41 of collar 4 includes an enlarged section 44 having a diameter greater than that of a remaining portion of longitudinal hole 43 and having an inner wall face defining annular inner periphery 440. Further, enlarged section 44 has a width extending along the axis and approximately equal to that of inner ring portion 363 of seal cover 3. Second end 42 of collar 4 includes a plurality of positioning holes 48 extending from an outer circumference of collar 4 through longitudinal hole 43. Positioning holes 48 are spaced from one another in a circumference direction. Coupling members 481 respectively extend into positioning holes 48 and abut against rotary shaft 2 to attach collar 4 to rotary shaft 2. An annular groove 47 is formed in an outer circumference of collar 4 and aligned with engaging slots 37 of seal cover 3. A positioning plate 471 is received in each engaging slot 37 of seal cover 3 and engaged in annular groove 47 of collar 4. A screw 472 extends through a hole in each positioning plate 471 into seal cover 3 to prevent collar 4 from moving relative to seal cover 3 along the axis.

Figure 5:
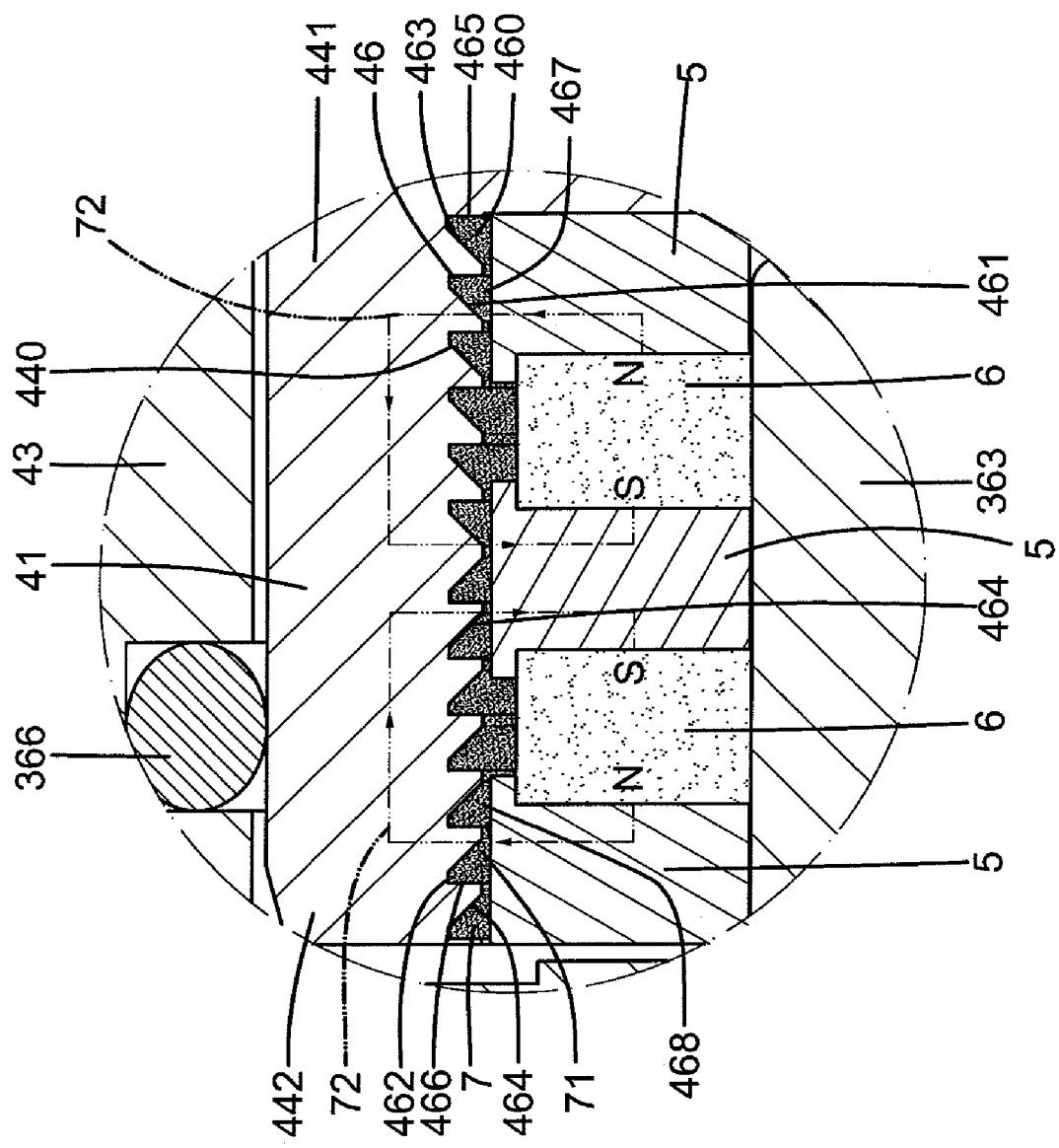
FIG. 5 shows an enlarged view of a circled portion of FIG. 4.

Inner periphery 440 of first end 41 of collar 4 includes a plurality of annular grooves 460 spaced from one another in a direction parallel to the axis with an annular protrusion 46 defined between two adjacent grooves 460 (see FIG. 5). First end 41 of collar 4 includes a first portion 441 adjacent to second end 42 of collar 4 and includes a second portion 442 distal to second end 42 and spaced from first portion 441 along the axis. Grooves 460 in first end 41 include a plurality of first grooves 461 in first portion 441 and a plurality of second grooves 462 in second portion 442. Each first groove 461 has right-angled triangular cross sections and includes a first opening 467 in inner periphery 440 of first end 41. First opening 467 includes a first side and a second side spaced from the first side along the axis and having a spacing to second end 42 of collar 4 larger than the first side of first opening 467. Each first groove 461 further has a first vertical face 465 extending from the first side of first opening 467 in a direction perpendicular to the axis and has a first beveled face 463 extending from the second side of first opening 467 and at an acute angle with the axis. Each second groove 462 has right-angled triangular cross sections and includes a second opening 468 in inner periphery 440 of first end 41. Second opening 468 includes a first side and a second side spaced from the first side along the axis and having a spacing to second end 42 of collar 4 larger than the first side of second opening 468. Each second groove 462 further has a second vertical face 466 extending from the second side of second opening 468 in the direction perpendicular to the axis and has a second beveled face 464 extending from the first side of second opening 468 and at an obtuse angle with the axis.

Pole pieces 5 are made of magnetizable material and each includes a central hole 51. Magnets 6 are annular-shaped and each includes a central hole 61. Pole pieces 5 and magnets 6 are alternately mounted between outer periphery 364 of inner ring portion 363 of seal cover 3 and first end 41 of collar 4 along the axis, with each magnet 6 sandwiched between two adjacent pole pieces 5. A gap 71 is formed between inner periphery 440 of first end 41 of collar 4 and outer peripheries of pole pieces 5.

Magnetic liquid 7 is filled in gap 71 via opening 381 in seal cover 3 and retained by closed magnetic circuits 72 with magnetic force created by magnets 6. Referring to FIG. 5, each closed magnetic circuit 72 flows from the N pole of one of magnets 6, through pole piece 5 located at the N pole side of magnet 6, across gap 71 between pole piece 5 at the N pole side of magnet 6 and first end 41 of collar 4 to enter first end 41 of collar 4, and then back across gap 71 between pole piece 5 located at the S pole side of magnet 6 and first end 41 of collar 4, and through pole piece 5 at the S pole side of magnet 6 to the S pole of magnet 6.

Annular protrusions 46 on inner periphery 440 of first end 41 concentrate magnetic field of magnets 6 to increase the density of magnetic fluxes 72 passing across gap 71. Furthermore, first beveled face 463 of each first groove 461 is at the acute angle with the axis and second beveled face 464 of each second groove 462 is at the obtuse angle with the axis so that magnetic liquid 7 in first and second grooves 461 and 462 has a tendency to flow towards a central portion of first end 41 of collar 4. Further, first vertical face 465 of each first groove 461 and second vertical face 466 of each second groove 462 stop magnetic liquid 7 in first and second grooves 461, 462 respectively to escape from openings in two sides of gap 71 during rotation of rotary shaft 2. Thus, magnetic liquid 7 can be securely retained in gap 71 to provide an effective seal between pump housing 1 and rotary shaft 2.

Figures 6, 6A:
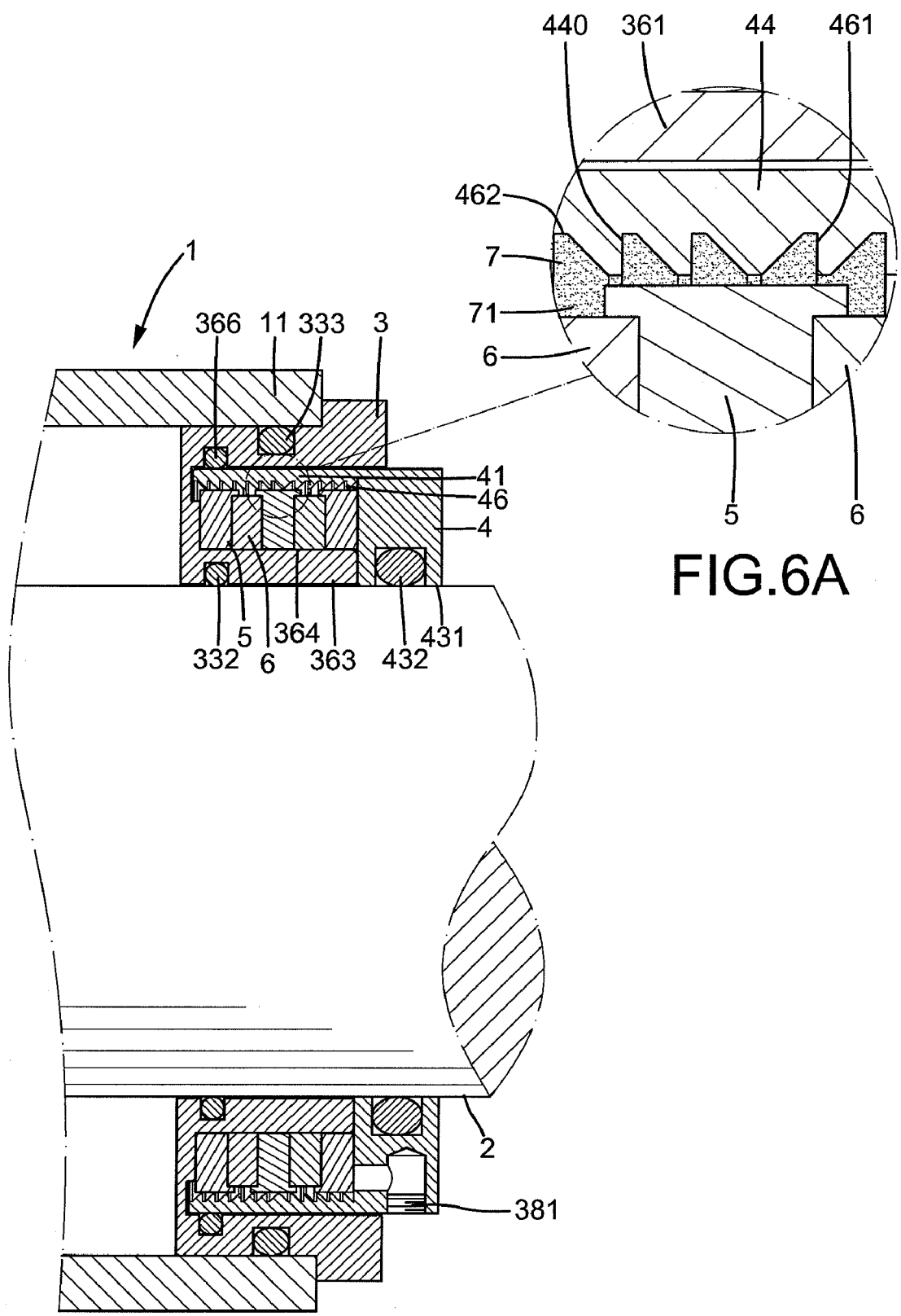
FIG. 6 shows a cross sectional view of a magnetic fluid shaft-sealing device of a second embodiment according to the preferred teachings of the present invention.
FIG. 6A shows an enlarged view of a circled portion of FIG. 6.
Figure 7:
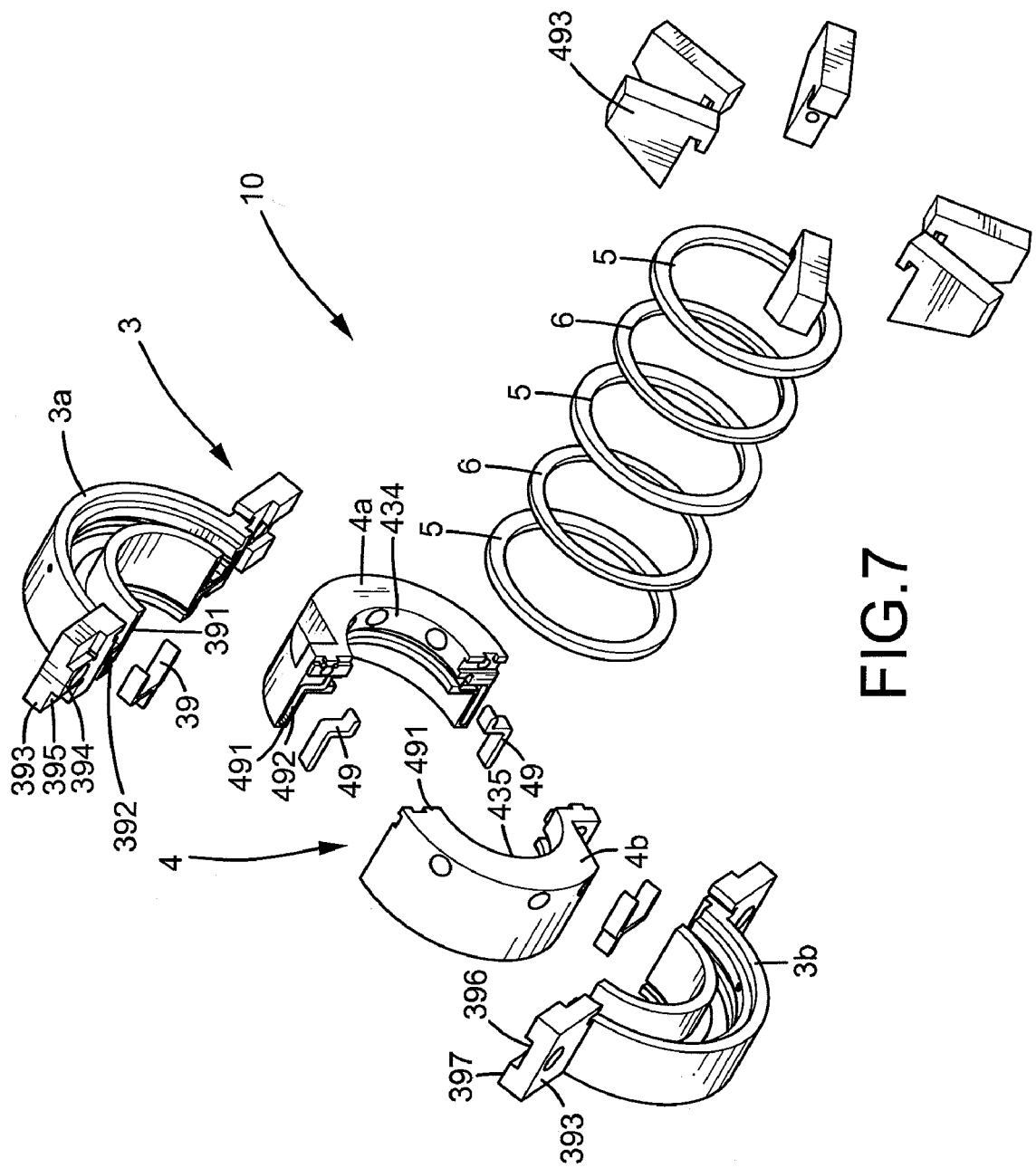
FIG. 7 shows an exploded perspective view of a magnetic fluid shaft-sealing device of a third embodiment according to the preferred teachings of the present invention.
Figure 8:
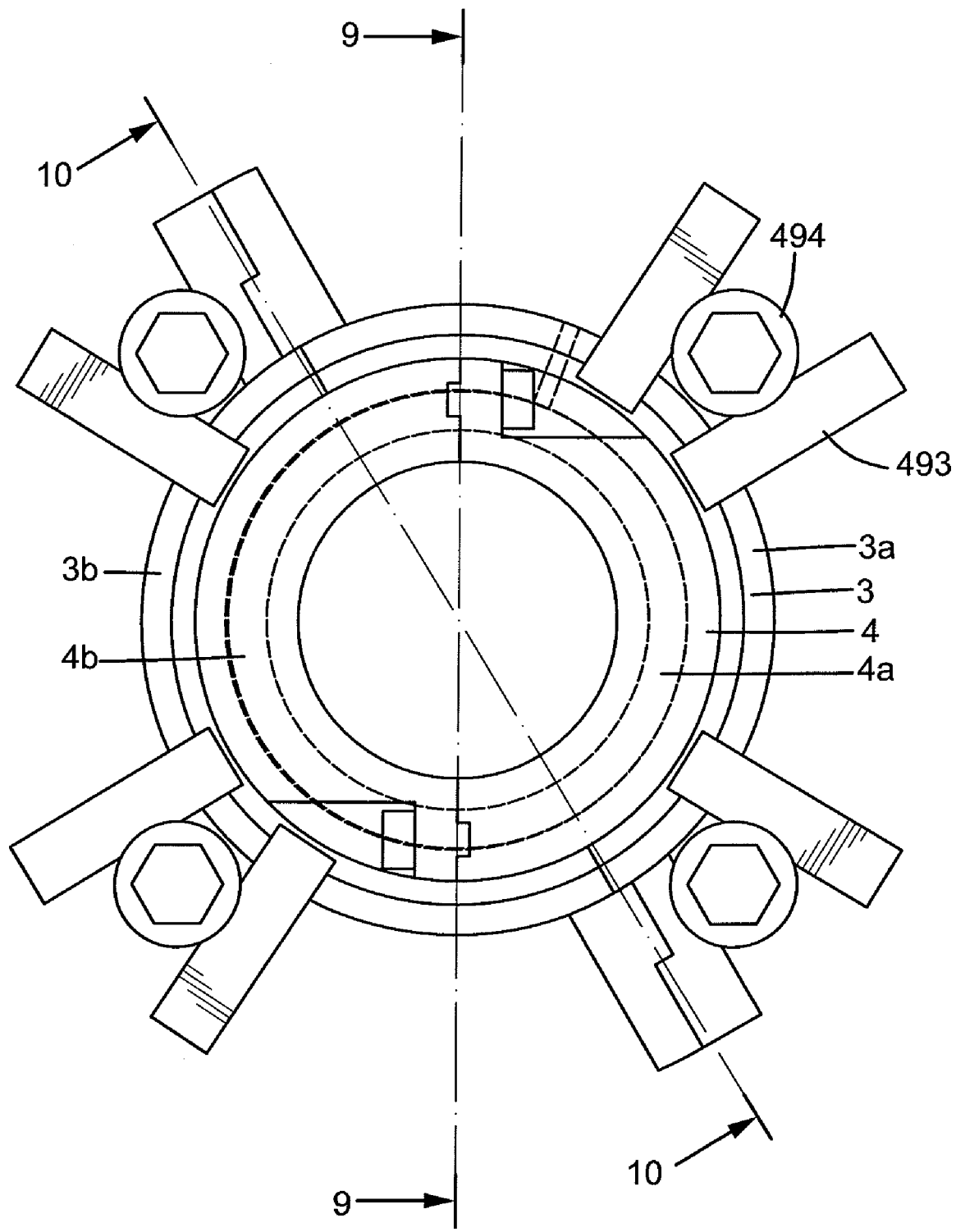
FIG. 8 shows a side view of the magnetic fluid shaft-sealing device of FIG. 7 after assembly.
Figure 9:
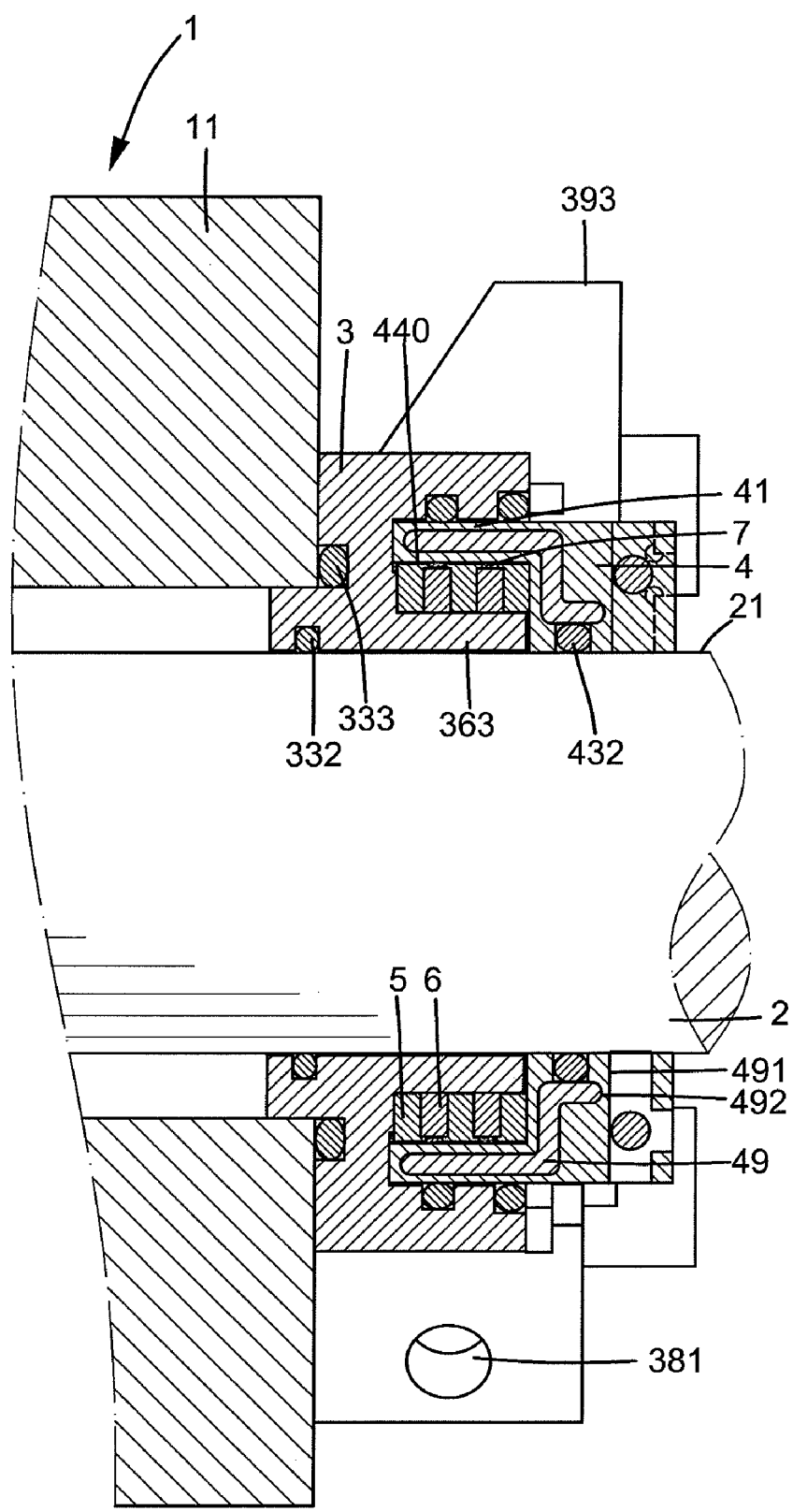
FIG. 9 shows a cross sectional view of the magnetic fluid shaft-sealing device of FIG. 7 taken along section line 9-9 of FIG. 8 with the magnetic fluid shaft-sealing device attached to a pump housing and mounted around a rotary shaft.
Figure 10:
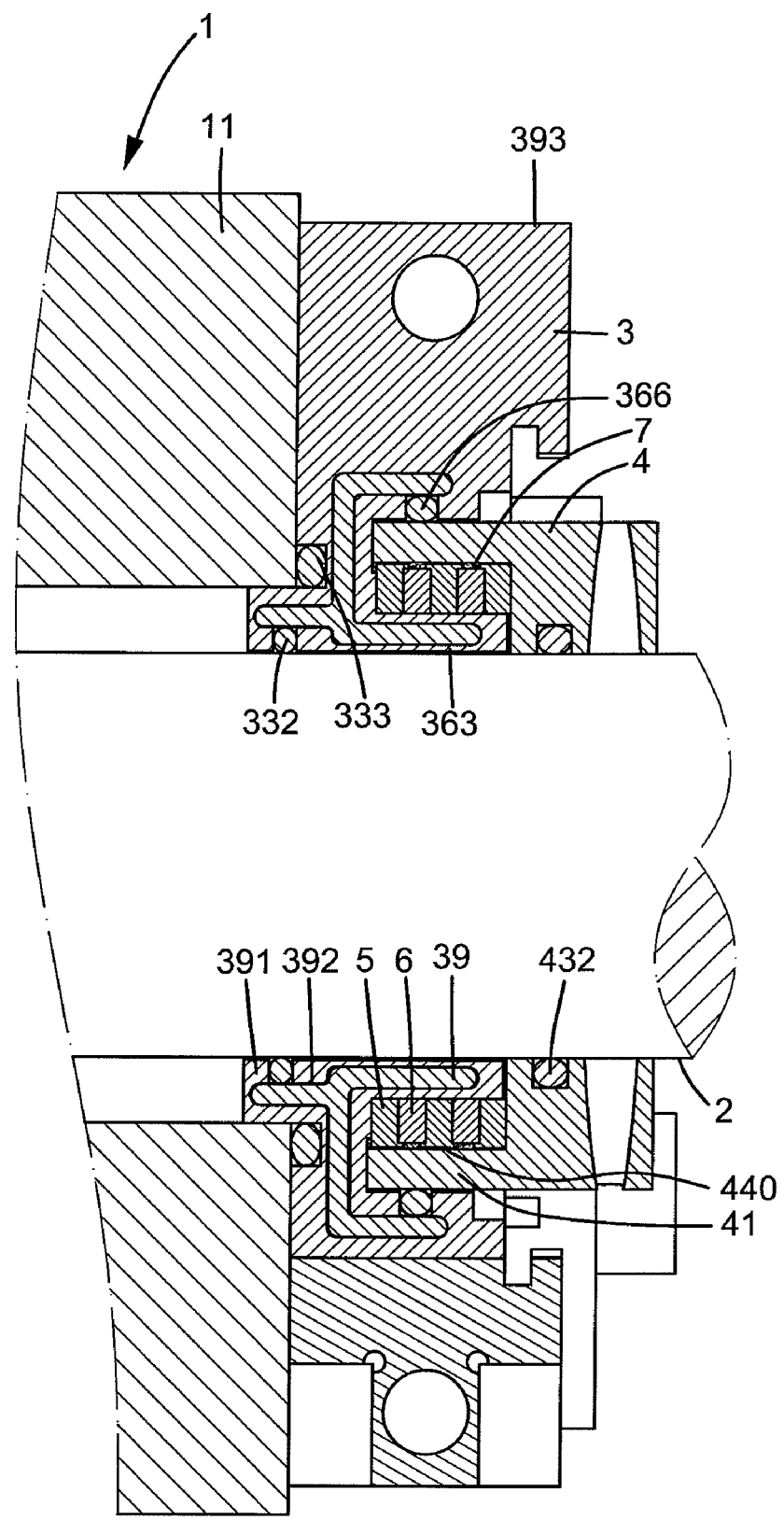
FIG. 10 shows a cross sectional view of the magnetic fluid shaft-sealing device of FIG. 7 taken along section line 10-10 of FIG. 8 with the magnetic fluid shaft-sealing device attached to the pump housing and mounted around the rotary shaft.

FIG. 6 and FIG. 6A show a magnetic fluid shaft-sealing device 10 of a second embodiment modified from the first embodiment. In this embodiment, screws 35 and coupling member 481 in the first embodiment are omitted. Collar 4 rotates with rotary shaft 2 by the frictional force generated from O-ring 432 engaged with rotary shaft 2. Magnetic fluid shaft-sealing device 10 in the second embodiment suits to an operational environment where pressure differences existing between two sides of the magnetic fluid seal are insignificant whereas magnetic fluid shaft-sealing device 10 in the first embodiment suits to an operational environment where great pressure differences exist between two sides of the magnetic fluid seal.

FIGS. 7-10 show a magnetic fluid shaft-sealing device 10 of a third embodiment of the present. In this embodiment, seal cover 3 includes first and second semi-annular cover portions 3a and 3b each including two ends each having a first coupling face 391 with a U-shaped recess 392. First coupling faces 391 of the two ends of the cover portion 3a are respectively coupled with first coupling faces 391 of the two ends of second cover portion 3b to form annular seal cover 3. A U-shaped gasket 39 is mounted between recess 392 of first coupling face 391 of each of the two ends of first cover portion 3a and recess 392 of first coupling face 391 of one of the two ends of second cover portion 3b to provide a sealing effect between two interconnected first coupling faces 391. First cover portion 3a further includes two coupling sections 393 each extending from one of the two ends thereof and each having a protrusion 394 and two recesses 395 in an inner face thereof. Second cover portion 3b further includes two coupling sections 393 each extending from one of the two ends thereof and each having a recess 396 and two protrusions 397 in an inner face thereof. Recess 396 and protrusions 397 of coupling sections 393 of second cover portion 3b are correspondingly engaged with protrusion 394 and recesses 385 of coupling sections 393 of first cover portion 3a. In this embodiment, instead of through-holes 34 and screws 35 of the first embodiment, a plurality of engaged plates 493 are provided to attach to first and second cover portions 3a and 3b and to support a plurality of screws 494 which extend into end 11 of pump housing 1 to attach seal cover 3 to pump housing 1. Collar 4 includes first and second semi-annular collar portions 4a and 4b each including two ends each having a second coupling face 491 with an N-shaped recess 492. Second coupling faces 491 of the two ends of first collar portion 4a are respectively coupled with second coupling faces 491 of the two ends of second collar portion 4b to form annular collar 4. An N-shaped gasket 49 is mounted between recess 492 of second coupling face 491 of each of the two ends of first collar portion 4a and recess 492 of second coupling face 491 of one of the two ends of second collar portion 4b to provide a sealing effect between two interconnected second coupling faces 491. This embodiment allows rapid detachment of seal cover 3 and collar 4 from pump housing 1 and rotary shaft 2 so as to facilitate maintenance or repair of magnetic fluid shaft-sealing device 10.

Figure 11:
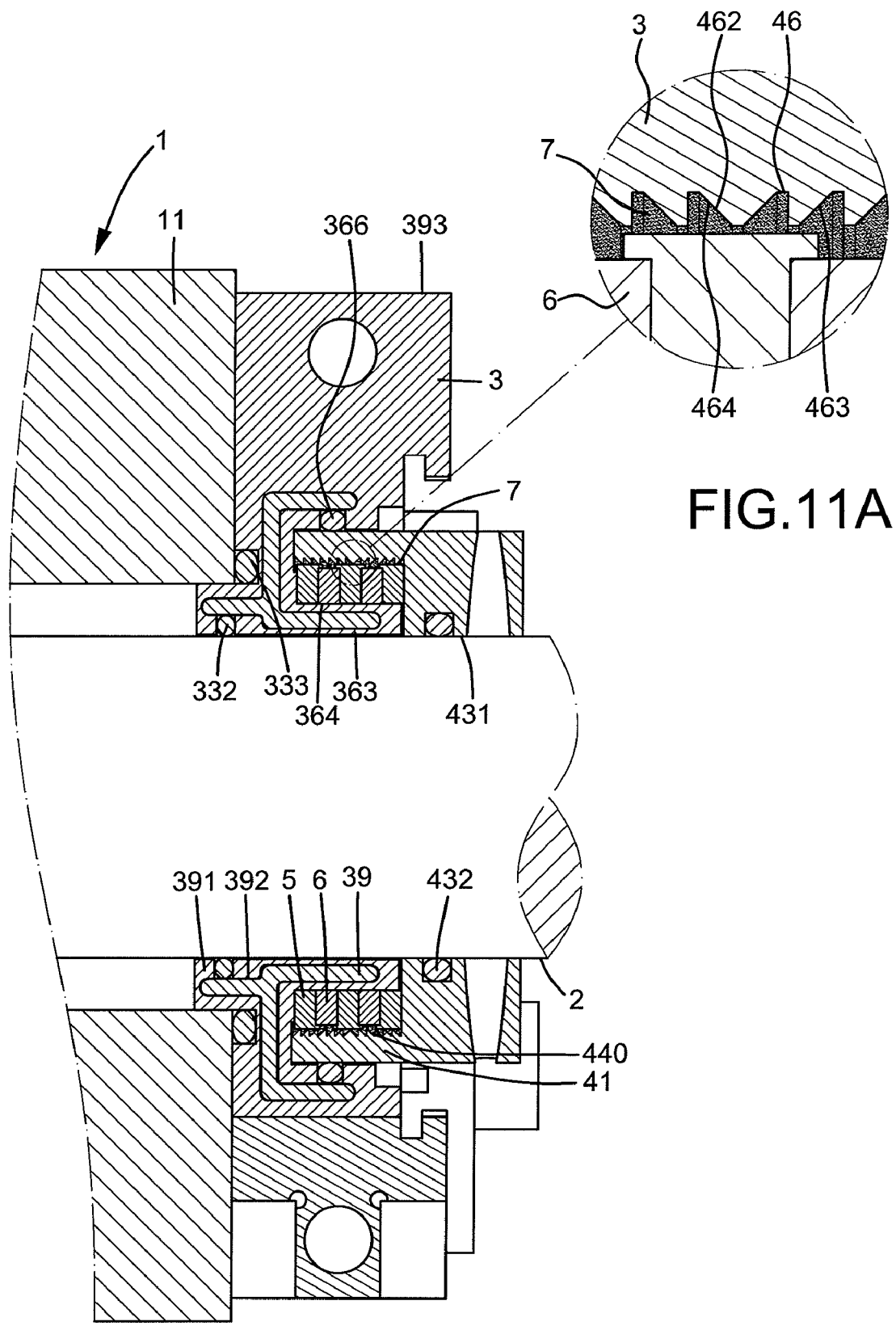
FIG. 11 shows a cross sectional view of a magnetic fluid shaft-sealing device of a fourth embodiment according to the preferred teachings of the present invention.
Figure 12:
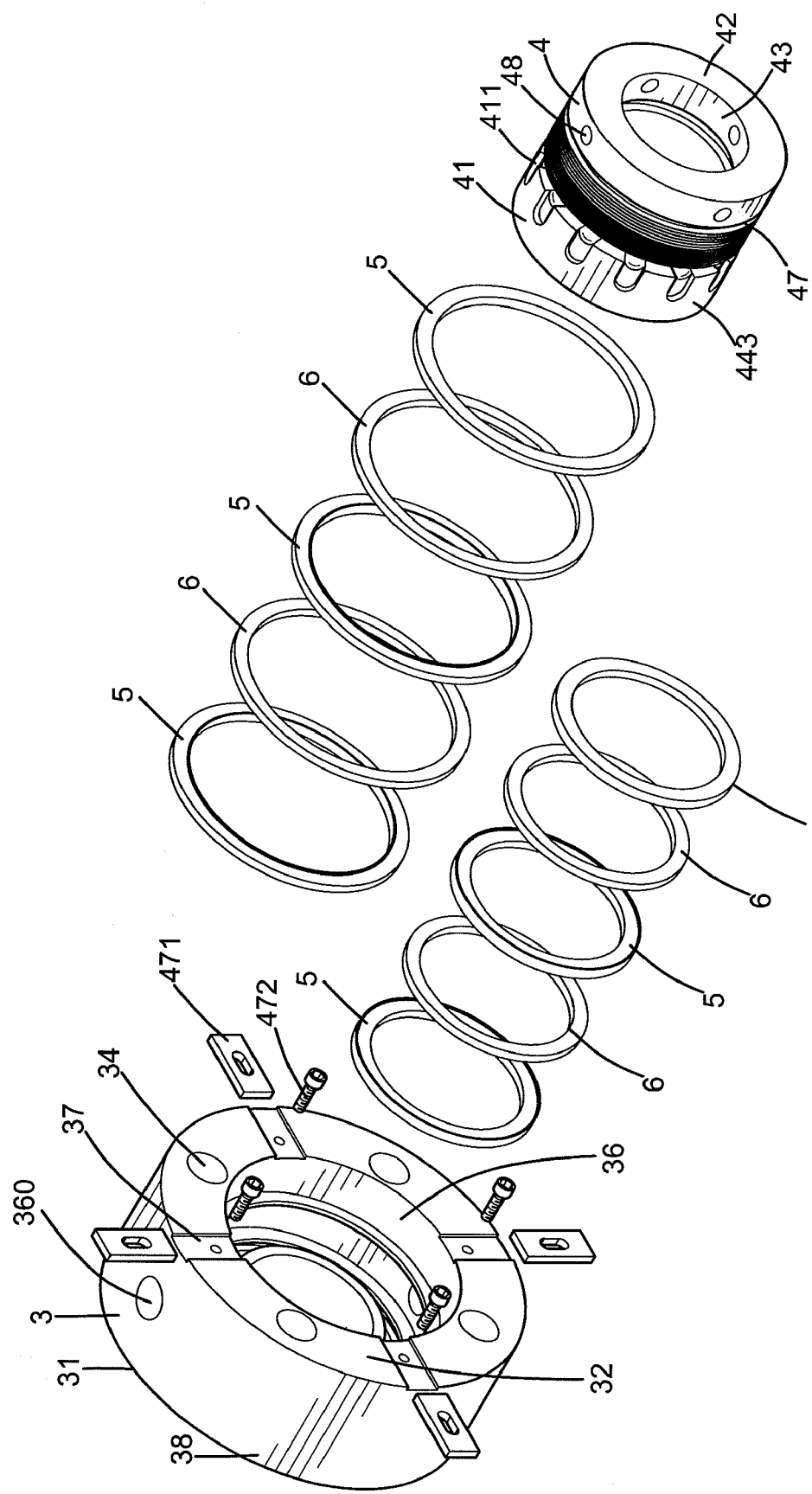
FIG. 12 shows an exploded, perspective view of a magnetic fluid shaft-sealing device of a fifth embodiment according to the preferred teachings of the present invention.
Figure 13:
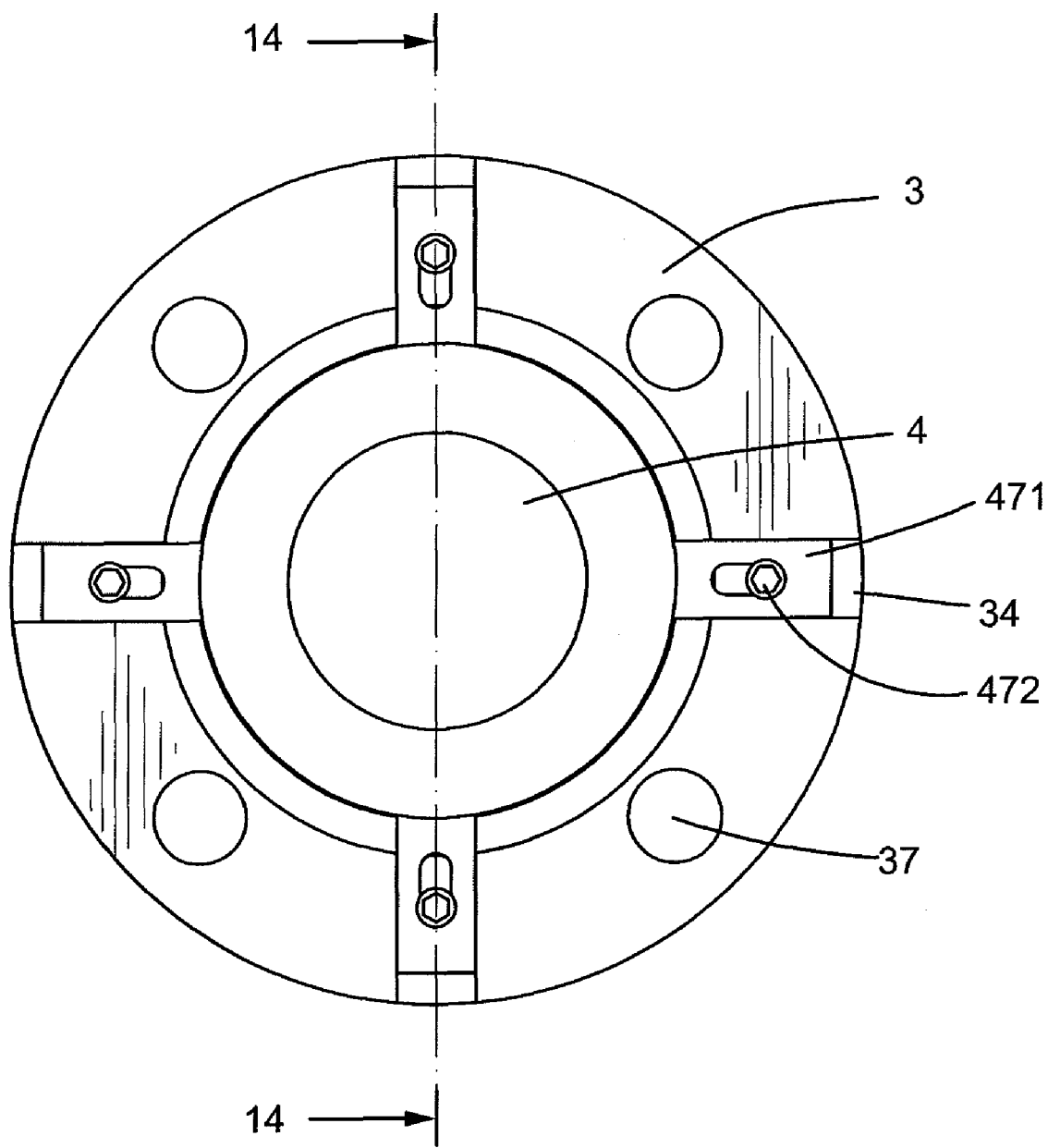
FIG. 13 shows a side view of the magnetic fluid shaft-sealing device of FIG. 12 after assembly.
Figure 14:
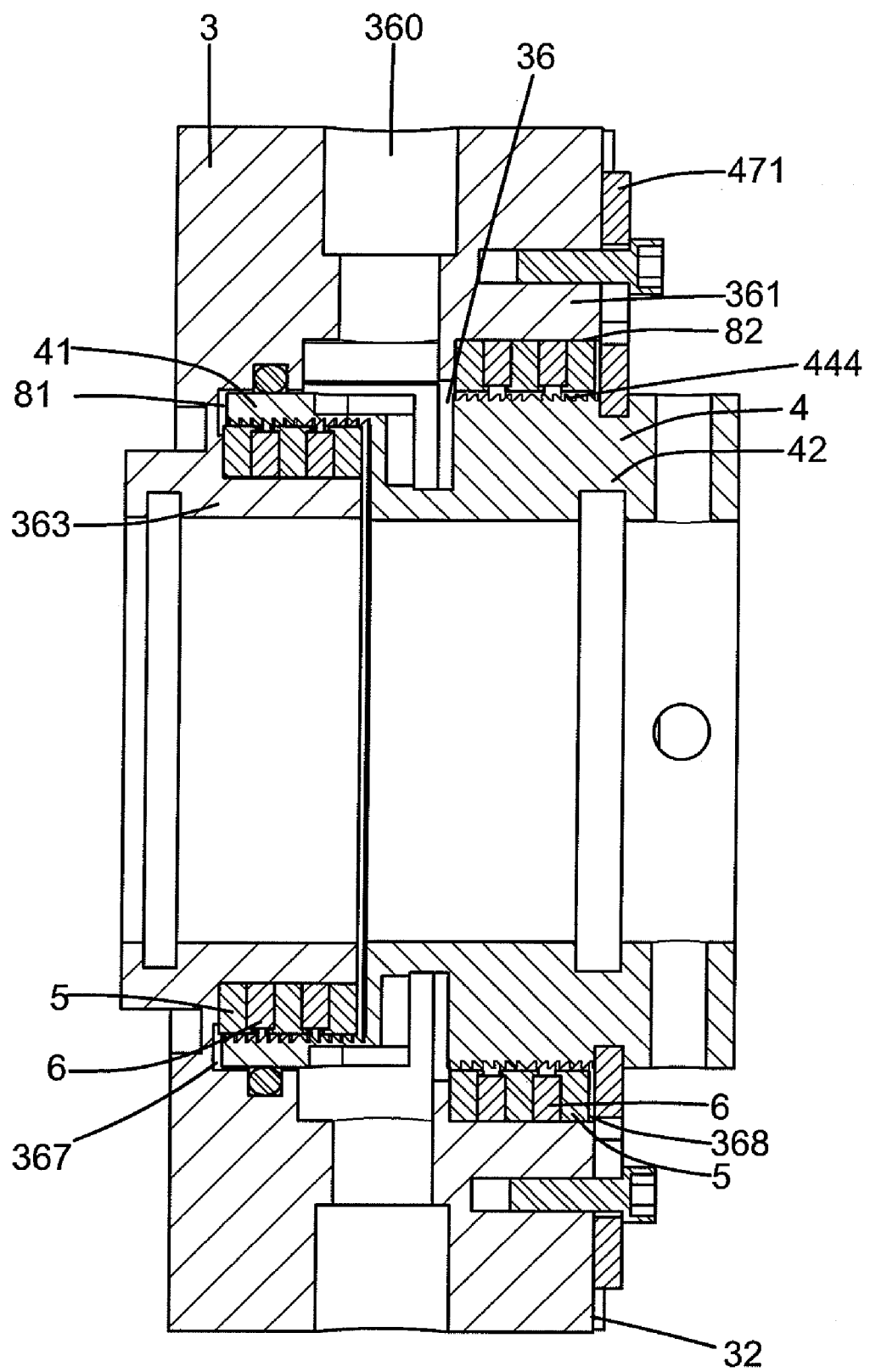
FIG. 14 shows a cross sectional view of the magnetic fluid shaft-sealing device of FIG. 12 taken along section line 14-14 of FIG. 13.
Figure 15:
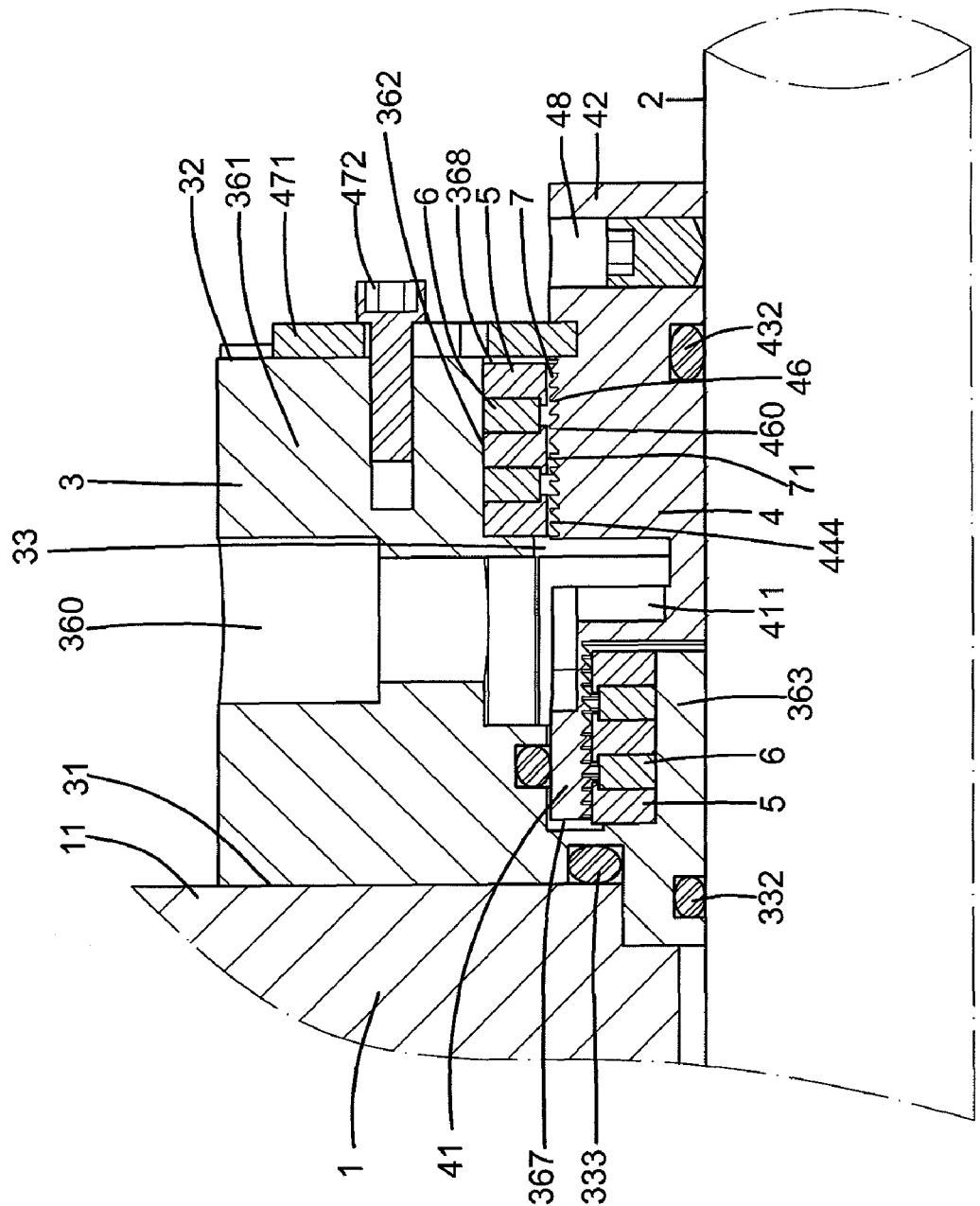
FIG. 15 shows an enlarged, sectional view of a portion of FIG. 14 with the magnetic fluid shaft-sealing device attached to the pump housing and mounted around the rotary shaft.
Figure 16:
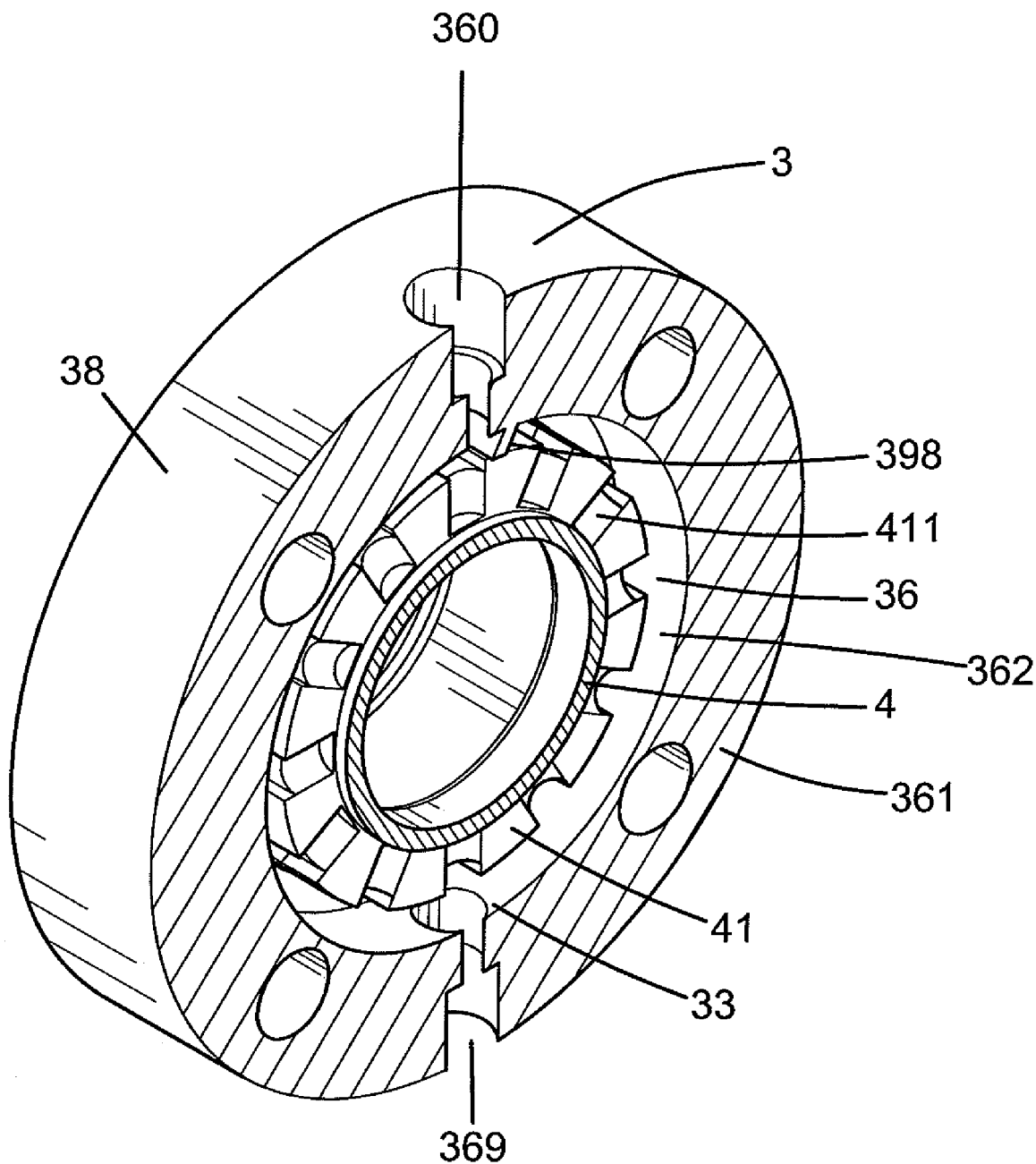
FIG. 16 shows a perspective view of the magnetic fluid shaft-sealing device of FIG. 12 with the magnetic fluid shaft-sealing device cutaway to show a seal cover and a collar.
Figure 17:
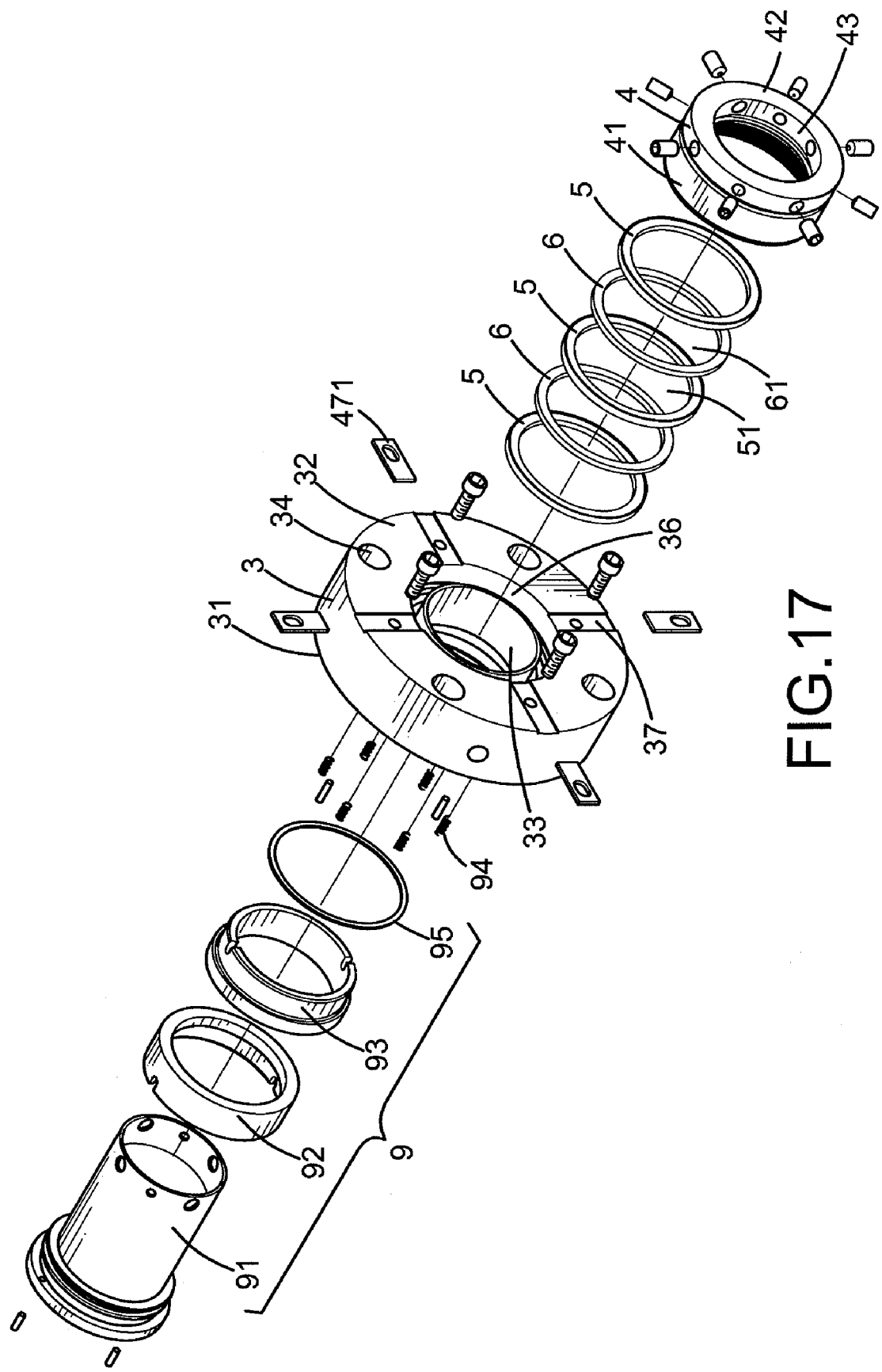
FIG. 17 shows an exploded perspective view of a magnetic fluid shaft-sealing device of a sixth embodiment according to the preferred teachings of the present invention.
Figure 18:
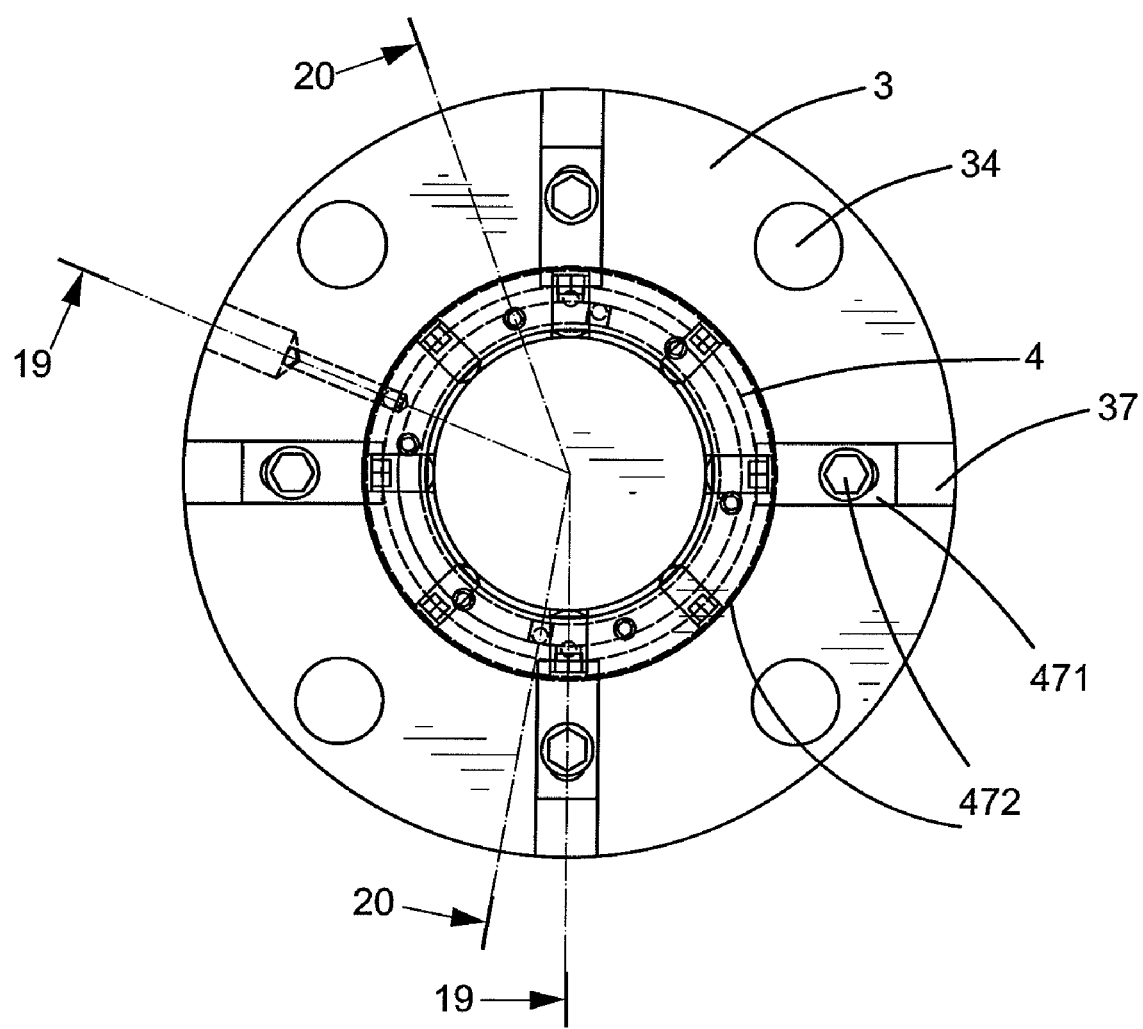
FIG. 18 shows a side view of the magnetic fluid shaft-sealing device of FIG. 17 after assembly.
Figure 19:
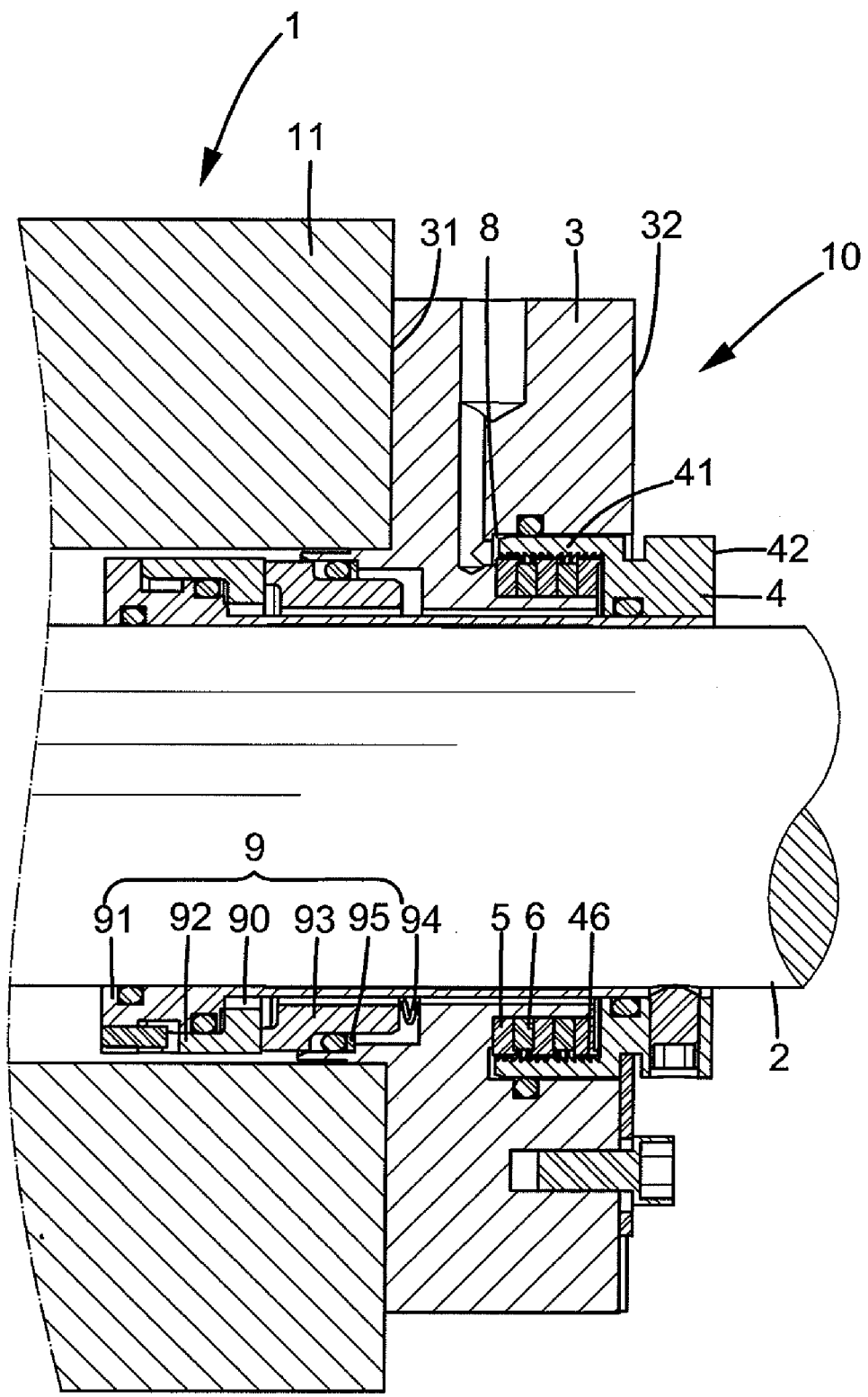
FIG. 19 shows a cross sectional view of the magnetic fluid shaft-sealing device of FIG. 17 taken along section line 19-19 of FIG. 18 with the magnetic fluid shaft-sealing device attached to a pump housing and mounted around a rotary shaft.
Figure 20:
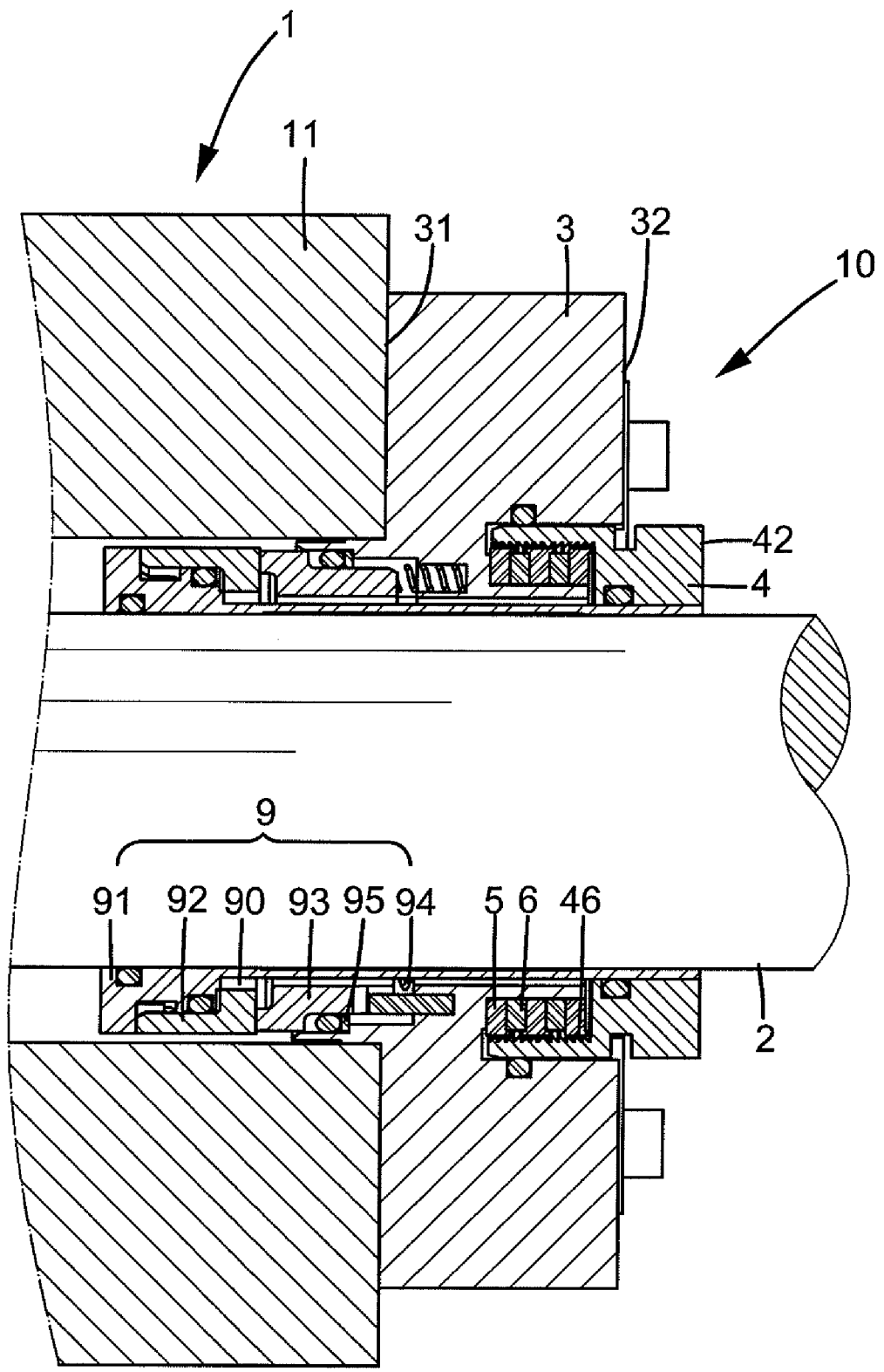
FIG. 20 shows a cross sectional view of the magnetic fluid shaft-sealing device of FIG. 17 taken along section line 20-20 of FIG. 18 with the magnetic fluid shaft-sealing device attached to the pump housing and mounted around the rotary shaft.

FIG. 11 and FIG. 11A show a magnetic fluid shaft-sealing device 10 of a fourth embodiment modified from the third embodiment. In this embodiment, protrusions 46 and grooves 460 similar to those of the first embodiment are added to inner periphery 440 of first end 41 of collar 4 of the third embodiment.

FIGS. 12-16 show a magnetic fluid shaft-sealing device 10 of a fifth embodiment modified from the first embodiment. In this modified embodiment, annular recess 36 in seal cover 3 has a stepped configuration with smaller and larger diameter portions. The small diameter portion defines a first, annular shaft-sealing section 367 whereas the large diameter portion defines a second, annular shaft-sealing section 368 spaced from first shaft-sealing section 367 along the axis and adjacent to outer end face 32 of seal cover 3. First end 41 of collar 4 is received in first shaft-sealing section 367 of annular recess 36 and mounted around inner ring portion 363 of seal cover 3 whereas a portion of second end 42 of collar 4 is received in second shaft-sealing section 368 of annular recess 36 such that a spacing is defined between an annular outer periphery 444 of second end 42 of collar 4 and inner periphery 362 of outer ring portion 361 of seal cover 3 in the radial direction. Two magnets 6 and three pole pieces 5 are mounted between outer ring portion 361 of seal cover 3 and outer periphery 444 of the portion of second end 42 of collar 4 and arranged in an alternate manner similar to that of the first embodiment. Another gap 73 is formed between outer periphery 444 of the portion of second end 42 of collar 4 and outer peripheries of pole pieces 5 and receives magnetic liquid 7 to provide a liquid seal therebetween. Further, outer periphery 444 of the portion of second end 42 of collar 4 includes grooves 460 similar to those grooves 460 in first end 41 of collar 4. In this embodiment, seal cover 3 further includes a coolant inlet 369 through which a coolant (not shown) is supplied into shaft hole 33. Seal cover 3 further includes a coolant outlet 360 extending from outer periphery 38 of seal cover 3 to shaft hole 33. A fender 398 is provided on an inner periphery 362 of outer ring portion 361 of seal cover 3 and adjacent to coolant outlet 360 to guide the coolant into coolant outlet 360 when the coolant is fed into shaft hole 33 and encounters fender 398. Further, first end 41 of collar 4 includes a plurality of recessed portions 411 in an outer periphery 443 thereof and annularly spaced from one another to assist in driving the coolant in shaft hole 33.

FIGS. 17-20 show a magnetic fluid shaft-sealing device 10 of a sixth embodiment of the invention, wherein a mechanical seal 9 is added. Mechanical seal 9 is mounted between end 11 of pump housing 1 and seal cover 3 and includes a shaft sleeve 91 extending through shaft hole 33 of seal cover 3. Shaft sleeve 91 is mounted around rotary shaft 2 to rotate therewith. Collar 4 is mounted around shaft sleeve 91 to rotate therewith. Mechanical seal 9 further includes a stationary ring 93 mounted around shaft sleeve 91 and secured in seal cover 3. Mechanical seal 9 further includes a rotary ring 92 moveably mounted around shaft sleeve 91 and biased toward stationary ring 93 to provide sealing engagement therebetween. Mechanical seal 9 further includes a plurality of springs 94 and a washer 95 biased by springs 94 and pressing against rotary ring 92 to urge rotary ring 92 into sealing engagement with stationary ring 93.

It can be appreciated that magnetic fluid shaft-sealing device 10 of the invention can include two pole pieces 5 and one magnet 6 sandwiched between the two pole pieces. However, more than two magnets 6 and more than three pole pieces 5 can be utilized and arranged in an alternate manner along the axis.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims.

The invention claimed is:

1. A magnetic fluid shaft-sealing device comprising, in combination:

a seal cover (3) including inner and outer end faces (31, 32) spaced along an axis, with the inner end face (31) of the seal cover (3) being adapted to be attached to an end (11) of a pump housing (1), with the seal cover (3) further including a shaft hole (33) extending from the inner end face (31) through the outer end face (32) along the axis, with the seal cover (3) further including an annular recess (36) formed in the outer end face (32) and around the shaft hole (33), with an inner ring portion (363) being defined between the annular recess (36) and the shaft hole (33), and with the inner ring portion (363) having an outer periphery (364) defining an inner wall face of the annular recess (36);

a collar (4) adapted to be mounted around a rotary shaft (2) in the pump housing (1) to rotate therewith, with the collar (4) including a first end (41) received in the annular recess (36) and around the inner ring portion (363) of the seal cover (3), with the collar (4) further including a second end (42) spaced from the first end (41) of the collar (4) along the axis, with the collar (4) further including a longitudinal hole (43) extending from the first end (41) through the second end (42) of the collar (4) and coaxial with the axis, with the rotary shaft (2) extending through the longitudinal hole (43) of the collar (4) and the shaft hole (33) of the seal cover (3), and with the first end (41) of the collar (4) including an annular inner periphery (440) having a spacing to the outer periphery (364) of the inner ring portion (363) of the seal cover (3) in a radial direction perpendicular to the axis;

a first magnet (6) mounted between the outer periphery (364) of the inner ring portion (363) of the seal cover (3) and the first end (41) of the collar (4);

first and second pole pieces (5) mounted between the outer periphery (364) of the inner ring portion (363) of the seal cover (3) and the first end (41) of the collar (4), with the first magnet (6) being sandwiched between the first and second pole pieces (5), and with a first gap (71) being formed between the inner periphery (440) of the first end (41) of the collar (4) and outer peripheries of the first and second pole pieces (5); and a first magnetic liquid (7) filled in the first gap (71) to provide a liquid seal between the inner periphery (440) of the first end (41) of the collar (4) and the outer peripheries of the first and second pole pieces (5).

2. The magnetic fluid shaft-sealing device as claimed in claim 1, with the inner periphery (440) of the first end (41) of the collar (4) including a plurality of annular grooves (460) spaced from one another in a direction parallel to the axis.

3. The magnetic fluid shaft-sealing device as claimed in claim 2, with the first end (41) of the collar (4) including a first portion (441) adjacent to the second end (42) of the collar (4) and including a second portion (442) distal to the second end (42) of the collar (4) and spaced from the first portion (441) of the first end (41) of the collar (4) along the axis, with the plurality of annular grooves (460) including a plurality of first grooves (461) in the first portion (441) and a plurality of second grooves (462) in the second portion (442) of the first end (41) of the collar (4), with each of the plurality of first grooves (461) having right-angled triangular cross sections and including a first opening (467) in the inner periphery (440) of the first end (41) of the collar (4), with the first opening (467) having a first side and a second side spaced from the first side of the first opening (467) along the axis and having a spacing to the second end (42) of the collar (4) larger than the first side of the first opening (467), with each of the plurality of first grooves (461) further having a first vertical face (465) extending from the first side of the first opening (467) in a direction perpendicular to the axis, with each of the plurality of first grooves (461) further having a first beveled face (463) extending from the second side of the first opening (467) and at an acute angle with the axis, with each of the plurality of second grooves (462) having right-angled triangular cross sections and including a second opening (468) in the inner periphery (440) of the first end (41) of the collar (4), with the second opening (468) having a first side and a second side spaced from the first side of the second opening (468) along the axis and having a spacing to the second end (42) of the collar (4) larger than the first side of the second opening (468), with each of the plurality of second grooves (462) further having a second vertical face (466) extending from the second side of the second opening (468) in a direction perpendicular to the axis, and with each of the plurality of second grooves (462) further having a second beveled face (464) extending from the first side of the second opening (468) and at an obtuse angle with the axis.

4. The magnetic fluid shaft-sealing device as claimed in claim 1, with the seal cover (3) including a first cover portion (3a) and a second cover portion (3b), with each of the first and second cover portions (3a, 3b) including two ends each having a first coupling face (391) with a first recess (392), with the first coupling faces (391) of the two ends of the first cover portion (3a) being respectively coupled with the first coupling faces (391) of the two ends of the second cover portion (3b) to form the annular seal cover (3), with a first gasket (39) being mounted between the first recess (392) of the first coupling face (391) of each of the two ends of the first cover portion (3a) and the first recess (392) of the first coupling face (391) of one of the two ends of the second cover portion (3b), with the collar (4) including a first collar portion (4a) and a second collar portion (4b), with each of the first and second collar portions (4a, 4b) including two ends each having a second coupling face (491) with a second recess (492), with the second coupling faces (491) of the two ends of the first collar portion (4a) being respectively coupled with the second coupling faces (491) of the two ends of the second collar portion (4b) to form the annular collar (4), and with a second gasket (49) being mounted between the second recess (492) of the second coupling face (491) of each of the two ends of the first collar portion (4a) and the second recess (492) of the second coupling face (491) of one of the two ends of the second collar portion (4b).

5. The magnetic fluid shaft-sealing device as claimed in claim 4, with the inner periphery (440) of the first end (41) of the collar (4) including a plurality of annular grooves (460) spaced from one another in a direction parallel to the axis.

6. The magnetic fluid shaft-sealing device as claimed in claim 5, with the first end (41) of the collar (4) including a first portion (441) adjacent to the second end (42) of the collar (4) and including a second portion (442) distal to the second end (42) of the collar (4) and spaced from the first portion (441) of the first end (41) of the collar (4) along the axis, with the plurality of annular grooves (460) including a plurality of first grooves (461) in the first portion (441) and a plurality of second grooves (462) in the second portion (442) of the first end (41) of the collar (4), with each of the plurality of first grooves (461) having right-angled triangular cross sections and including a first opening (467) in the inner periphery (440) of the first end (41) of the collar (4), with the first opening (467) having a first side and a second side spaced from the first side of the first opening (467) along the axis and having a spacing to the second end (42) of the collar (4) larger than the first side of the first opening (467), with each of the plurality of first grooves (461) further having a first vertical face (465) extending from the first side of the first opening (467) in a direction perpendicular to the axis, with each of the plurality of first grooves (461) further having a first beveled face (463) extending from the second side of the first opening (467) and at an acute angle with the axis, with each of the plurality of second grooves (462) having right-angled triangular cross sections and including a second opening (468) in the inner periphery (440) of the first end (41) of the collar (4), with the second opening (468) having a first side and a second side spaced from the first side of the second opening (468) along the axis and having a spacing to the second end (42) of the collar (4) larger than the first side of the second opening (468), with each of the plurality of second grooves (462) further having a second vertical face (466) extending from the second side of the second opening (468) in a direction perpendicular to the axis, and with each of the plurality of second grooves (462) further having a second beveled face (464) extending from the first side of the second opening (468) and at an obtuse angle with the axis.

7. The magnetic fluid shaft-sealing device as claimed in claim 3, with the longitudinal hole (43) in the first end (41) of the collar (4) including an enlarged section (44) having a diameter greater than that of a remaining portion of the longitudinal hole (43) and having an inner wall face defining the annular inner periphery (440) of the first end (41) of the collar (4), and with the enlarged section (44) having a width parallel to the axis direction approximately equal to that of the inner ring portion (363) of the seal cover (3).

8. The magnetic fluid shaft-sealing device as claimed in claim 3, further comprising, in combination: a mechanical seal (9) adapted to be mounted between the end (11) of the pump housing (1) and the seal cover (3), with the mechanical seal (9) including a shaft sleeve (91) extending through the shaft hole (33) of the seal cover (3) and adapted to be mounted around the rotary shaft (2) to rotate therewith, with the collar (4) being mounted on the shaft sleeve (91); a stationary ring (93) mounted around the shaft sleeve (91) and secured in the seal cover (3); and a rotary ring (92) moveably mounted around the shaft sleeve (91) and biased toward the stationary ring (93) to provide sealing engagement therebetween.

9. The magnetic fluid shaft-sealing device as claimed in claim 1, with the seal cover (3) further including an outer ring portion (361) radially outside of the annular recess (36), with a portion of the second end (42) of the collar (4) being received in the annular recess (36) of the seal cover (3) and including an annular outer periphery (444) having a spacing to the outer ring portion (361) of the seal cover (3) in the radial direction, with a second magnet (6) and third and fourth pole pieces (5) being mounted between the outer ring portion (361) of the seal cover (3) and the annular outer periphery (444) of the portion of the second end (42) of the collar (4), with the second magnet (6) being sandwiched between the third and fourth pole pieces (5), with a second gap (73) being formed between the annular outer periphery (444) of the second end (42) of collar (4) and outer peripheries of the third and fourth pole pieces (5), and with a second magnetic liquid (7) being filled in the second gap (73) to provide a liquid seal between the annular outer periphery (444) of the second end (42) of the collar (4) and the outer peripheries of the third and fourth pole pieces (5).

10. The magnetic fluid shaft-sealing device as claimed in claim 9, with the seal cover (3) further including a coolant inlet (369) through which a coolant is supplied into the shaft hole (33), with the seal cover (3) further including a coolant outlet (360) extending from an outer periphery (38) of the seal cover (3) to the shaft hole (33), with a fender (398) being provided at an inner periphery (362) of the outer ring portion (361) of the seal cover (3) and adjacent to the coolant outlet (360) to guide the coolant into the coolant outlet (360) when the coolant is fed into the shaft hole (33) and encounters the fender (398), and the first end (41) of the collar (4) including a plurality of recessed portions (411) in an outer periphery (443) thereof to assist in driving the coolant in the shaft hole (33).

* * * * *